(12) United States Patent
O'Brien et al.

(10) Patent No.: US 9,091,461 B2
(45) Date of Patent: Jul. 28, 2015

(54) GROUNDING SYSTEM FOR PHOTOVOLTAIC ARRAYS

(75) Inventors: Edward Joseph O'Brien, Haddonfield, NJ (US); Michael J. Moulder, Wilmington, DE (US); Kenneth A. Layre, Jamison, PA (US)

(73) Assignee: Blue Sunny Skies LLC, Greenville, DE (US)

( * ) Notice: Subject to any disclaimer, the term of this patent is extended or adjusted under 35 U.S.C. 154(b) by 1127 days.

(21) Appl. No.: 13/095,321

(22) Filed: Apr. 27, 2011

(65) Prior Publication Data
US 2012/0275066 A1 Nov. 1, 2012

(51) Int. Cl.
| | |
|---|---|
| H02S 20/24 | (2014.01) |
| F24J 2/52 | (2006.01) |
| H01R 4/26 | (2006.01) |
| H01R 4/64 | (2006.01) |

(52) U.S. Cl.
CPC ............... *F24J 2/5237* (2013.01); *F24J 2/526* (2013.01); *F24J 2/5254* (2013.01); *H01R 4/26* (2013.01); *H01R 4/64* (2013.01); *H02S 20/24* (2014.12); *Y02E 10/47* (2013.01); *Y10T 29/49826* (2015.01)

(58) Field of Classification Search
CPC ......... Y02E 10/50; H02S 20/00; H02S 20/23; H02S 20/24; H02S 20/25; H02S 40/44; H02S 40/12; Y02B 10/12
See application file for complete search history.

(56) References Cited

U.S. PATENT DOCUMENTS

| | | | |
|---|---|---|---|
| 5,094,622 A * | 3/1992 | Auclair ............................ 439/92 |
| 6,111,189 A | 8/2000 | Garvison et al. | |
| 6,269,596 B1 | 8/2001 | Ohtsuka et al. | |
| 7,780,472 B2 | 8/2010 | Lenox | |
| 8,092,129 B2 | 1/2012 | Wiley et al. | |
| 8,353,650 B2 | 1/2013 | Wiley et al. | |
| 2003/0101662 A1* | 6/2003 | Ullman ............................. 52/27 |
| 2004/0128923 A1* | 7/2004 | Moulder et al. ............. 52/173.1 |
| 2007/0248434 A1* | 10/2007 | Wiley et al. .................... 411/160 |
| 2008/0053517 A1* | 3/2008 | Plaisted et al. ................ 136/251 |
| 2009/0000220 A1* | 1/2009 | Lenox .......................... 52/173.1 |
| 2010/0147359 A1 | 6/2010 | Harberts et al. | |
| 2010/0180933 A1 | 7/2010 | Aftanas et al. | |
| 2010/0236162 A1* | 9/2010 | Tweedie ....................... 52/127.6 |
| 2011/0000544 A1 | 1/2011 | West | |

(Continued)

FOREIGN PATENT DOCUMENTS

| | | |
|---|---|---|
| JP | H10-317621 A | 12/1998 |
| JP | 2006-144267 A | 6/2006 |

(Continued)

OTHER PUBLICATIONS

Extended European Search Report issued Oct. 9, 2014 in EP Application No. 12163751.6.

*Primary Examiner* — Thienvu Tran
*Assistant Examiner* — Angela Brooks
(74) *Attorney, Agent, or Firm* — Panitch Schwarze Belisario & Nadel LLP

(57) ABSTRACT

A grounding system for a photovoltaic or solar cell array includes a strap positioned over adjacent solar module frames and a grounding clip positioned between the adjacent solar module frames and a docking support surface. The grounding clip has two regions of upwardly and downwardly extending protrusions and a through-hole disposed between the two regions. Each protrusion has a serrate portion adapted to penetrate through anodized layers of the solar module frames and the docking support surface for the solar module frames.

10 Claims, 11 Drawing Sheets

(56) References Cited

U.S. PATENT DOCUMENTS

| | | |
|---|---|---|
| 2011/0039430 A1 | 2/2011 | Aftanas |
| 2011/0151703 A1* | 6/2011 | Parker et al. ............. 439/338 |
| 2012/0244729 A1* | 9/2012 | Rivera et al. ............... 439/97 |
| 2012/0275066 A1* | 11/2012 | O'Brien et al. ............... 361/1 |
| 2013/0078053 A1 | 3/2013 | Wiley et al. |
| 2013/0109249 A1* | 5/2013 | Roth ........................ 439/816 |
| 2013/0316601 A1* | 11/2013 | Kellerman et al. ......... 439/884 |
| 2014/0154908 A1* | 6/2014 | Magno et al. .............. 439/345 |
| 2014/0311552 A1* | 10/2014 | Garrett ....................... 136/251 |
| 2015/0007872 A1* | 1/2015 | Cap et al. ................... 136/251 |

FOREIGN PATENT DOCUMENTS

| | | |
|---|---|---|
| JP | 2010-147053 A | 7/2010 |
| WO | 2010131386 A1 | 11/2010 |

* cited by examiner

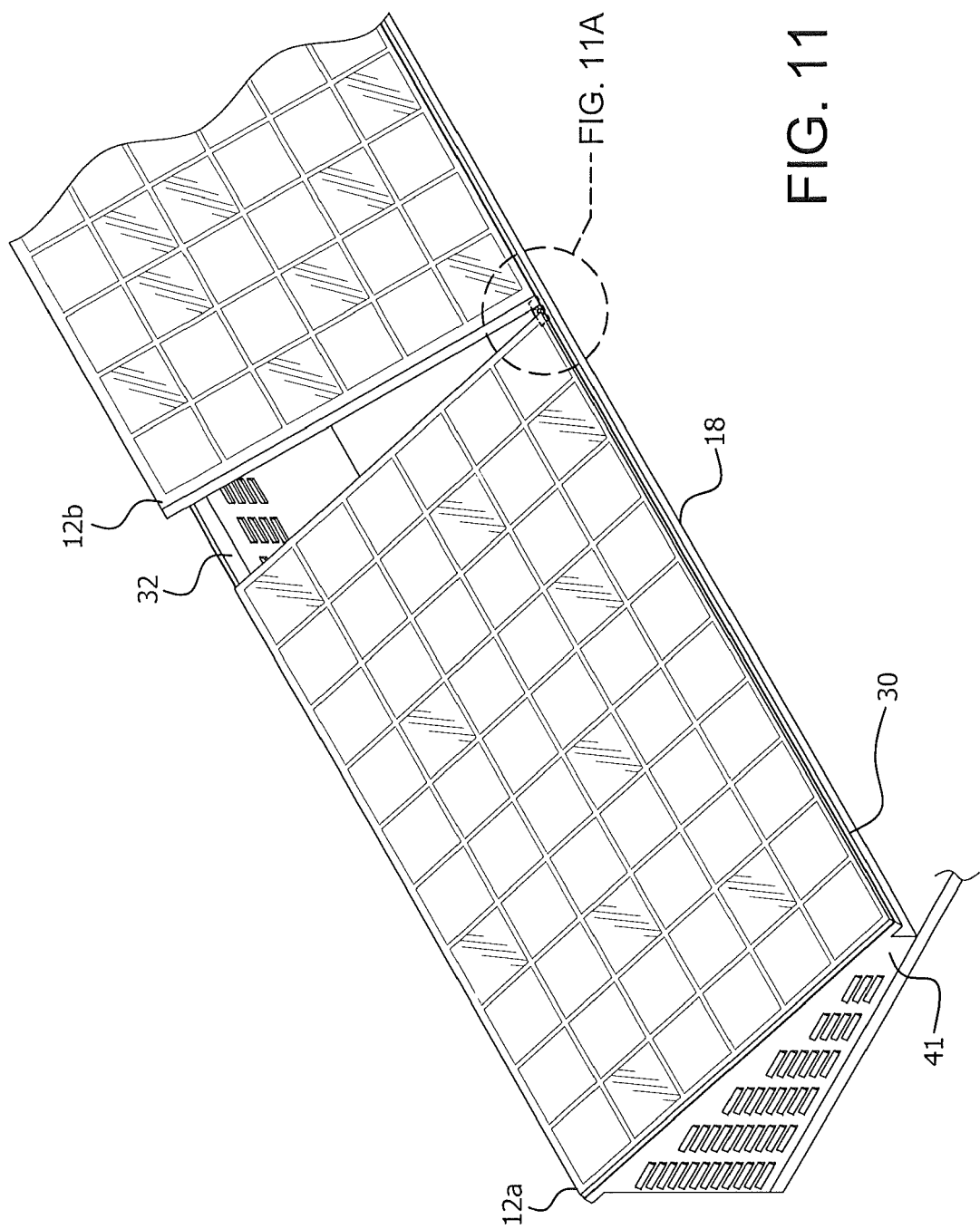

GROUNDING SYSTEM FOR PHOTOVOLTAIC ARRAYS

BACKGROUND OF THE INVENTION

1. Field of the Invention

The field of the present invention is grounding systems for photovoltaic or solar arrays.

2. Background

As the demand for clean energy sources increases, manufacturers of photovoltaic arrays are driven to reduce costs. To meet demand, without sacrificing system quality and safety requirements, some manufacturers seek to improve installation efficiencies. Few manufacturers, however, have effectively improved installation efficiency related to grounding methods, while meeting or exceeding safety standards. This lack of effectiveness is likely due, in part, to the complexity of framing and mounting systems used for many types of photovoltaic arrays.

According to internationally accepted standards for photovoltaic arrays, grounding is required for each module of a solar panel. To ground each module, conventional systems use copper ground wire laid along each row in a module array. For larger scale installations, this may amount to the laying of several hundred feet of wire. The wire is then physically and electrically coupled to the frame of each module, using fasteners affixed to the outer surface of the module frame. Electrical coupling is typically achieved by connecting the wire to a lay-in lug, which is then coupled to a star washer, screw, and nut. The star washer, screw, and nut combination is used to penetrate anodized coatings disposed on the module frame.

When this type of grounding method is used, material and installation costs are substantial. Material costs include purchasing copper ground wire, typically heavy gage wire ranging from 6 to 8 American Wire Gage (AWG), as well as coupling hardware. Installation costs include, but are not limited to, costs for time and labor. Installers may, for example, be required to transport cable and hardware, lay cable, and fasten cable to each module in the array. Thus, installation is often time consuming and laborious. While this type of installation method is suitable for its intended purpose, more effective grounding systems for photovoltaic arrays are needed, particularly as demand for clean energy sources continues to increase.

SUMMARY OF THE INVENTION

In a first aspect, a grounding system for a photovoltaic array includes a strap positioned over two solar module frames and a grounding clip. The grounding clip has regions on which upwardly and downwardly extending protrusions are located and a through-hole disposed between separate regions. Each protrusion has a serrate portion of material that is adapted to penetrate anodized layers disposed on both the module frames and the docking support surface for the solar module frames.

The strap preferably is coupled to the module and the grounding clip using a fastening assembly, such as metallic washers and a bolt and nut combination. The bolt is thereafter threaded and aligned with through-holes on the strap, the grounding clip, and the docking surface. After alignment, torque is applied to the fastening assembly, causing compression of the grounding clip. Upon proper positioning and coupling, the protrusions of the grounding clip are adapted to penetrate anodized layers on the module frame and the docking surface.

BRIEF DESCRIPTION OF THE DRAWINGS

The drawings described herein are for illustrative purposes only and are not intended to limit the scope of the present disclosure. In the drawings:

FIG. 11 is a perspective view of a photovoltaic array showing placement of a second solar module frame in the mounting structure shown in FIG. 2;

DETAILED DESCRIPTION

Figure 1:
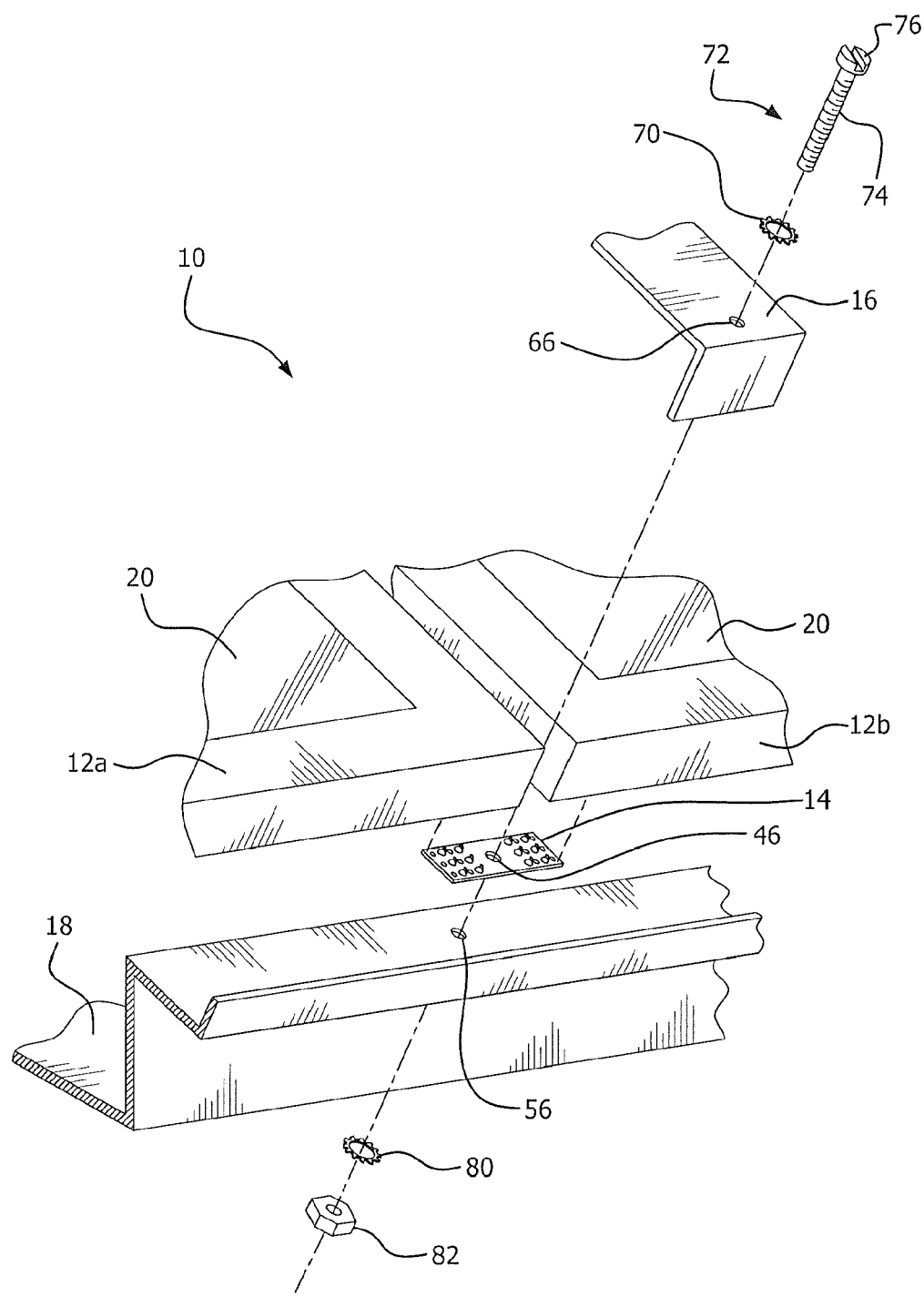
FIG. 1 is an exploded view of a grounding system.
Figure 15:
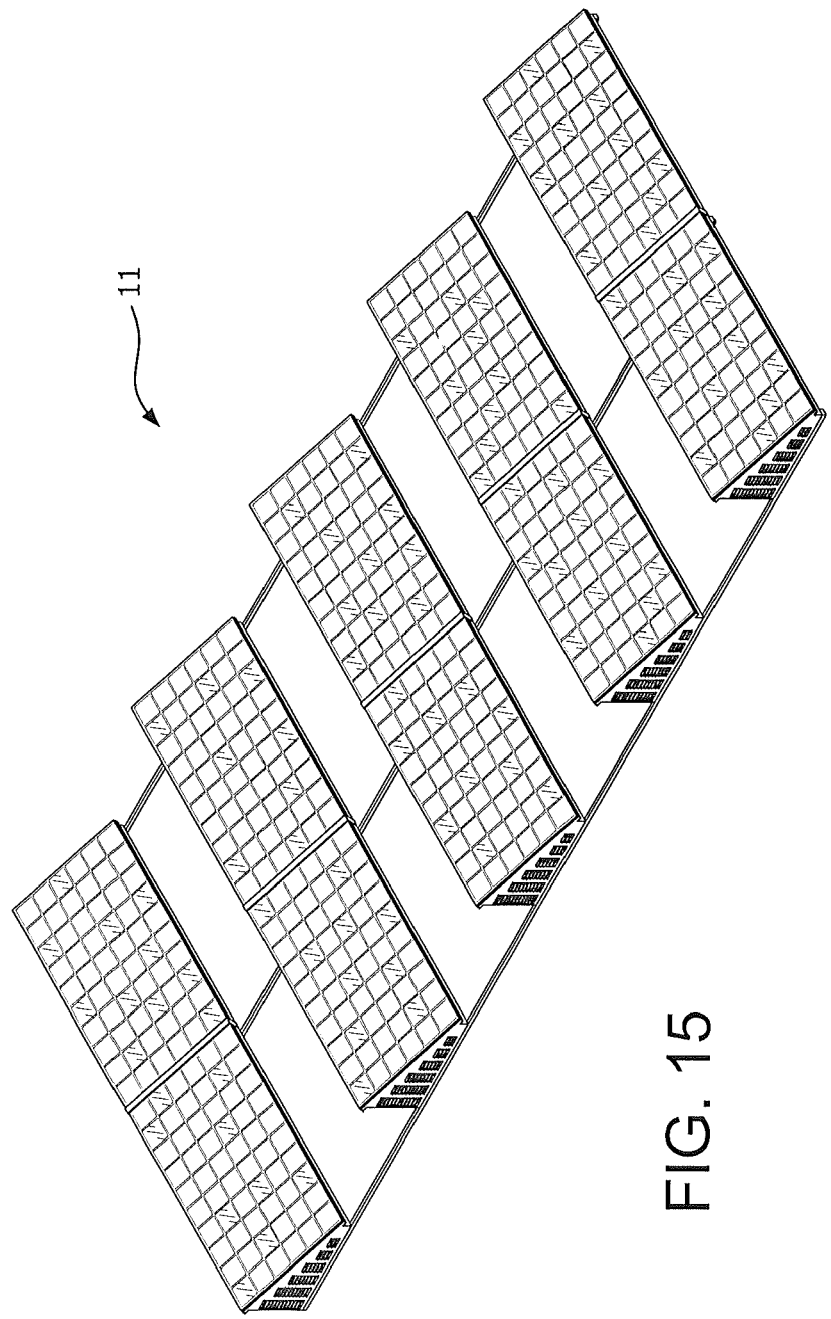
FIG. 15 is a perspective view of an array incorporating the grounding systems shown in FIGS. 1, 11, 13 and 14.

Turning in detail to the drawings, FIG. 1 illustrates a grounding system 10 for a photovoltaic array 11 (shown in FIG. 15). The grounding system 10 generally includes two solar module frames 12a, 12b, a grounding clip 14, a strap 16, a mounting structure 18, and one or more fastening assemblies. Preferably, each module frame 12 is constructed from an electrically conductive material, such as aluminum, and may include an anodized layer. Any other conductive material may be used to construct the module frame 12. Anodized aluminum is preferred, however. The module frame is adapted to house solar panels 20.

Figure 2:
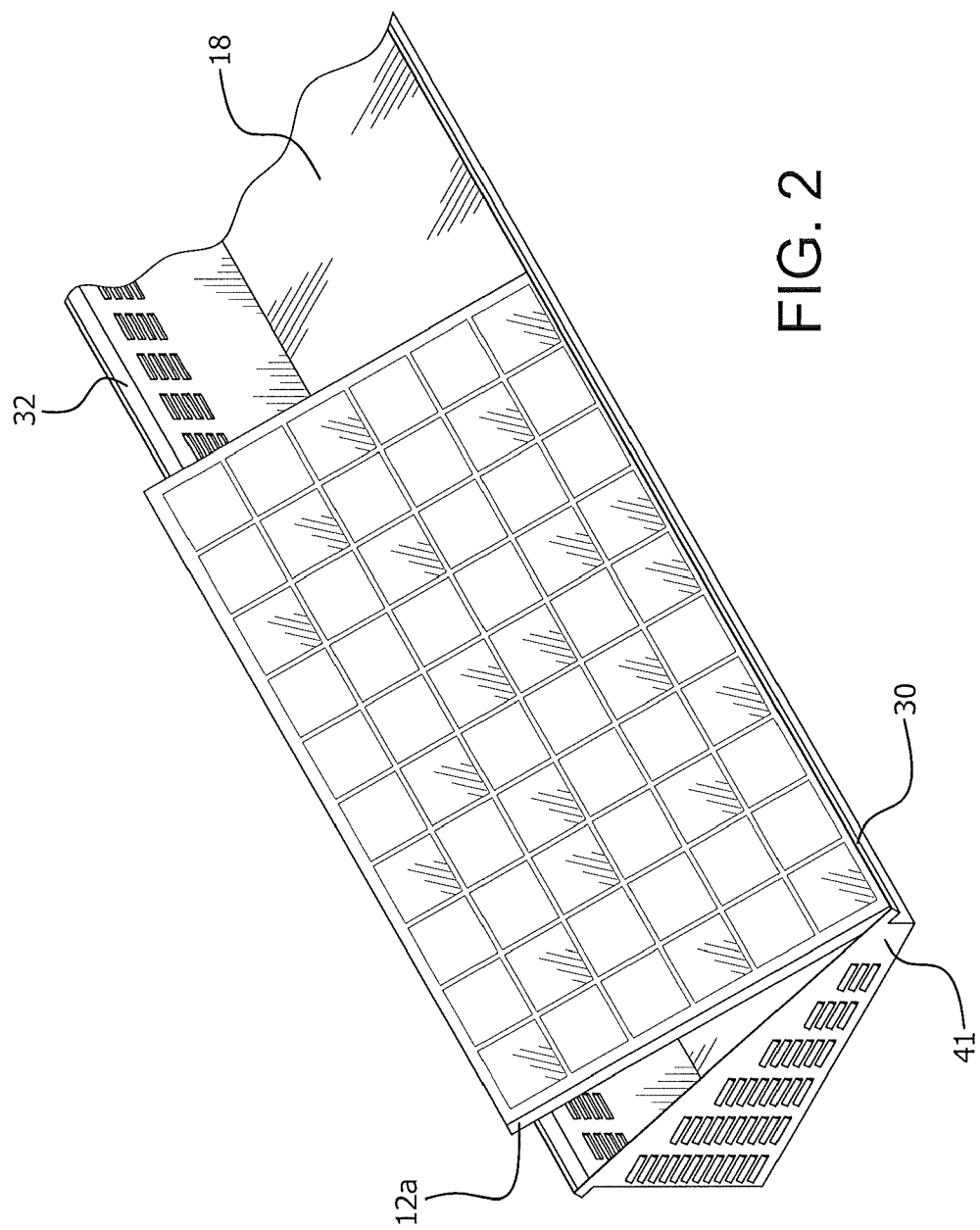
FIG. 2 illustrates placement of a solar module frame onto a mounting structure.

As shown in FIG. 2, the solar module frame 12 is further adapted for placement into a mounting structure 18. Exemplary mounting structures of this type are shown in U.S. Pat. No. 6,968,654, the disclosure of which is incorporated by reference herein in its entirety. The mounting structure 18 is of a type that may be surface mounted on a roof and adapted to support one or more ballasts (not shown). The roof onto which such mounting structures may be installed includes a flat roof or a slanted roof that has a maximum pitch angle that preferably does not exceed about 7 degrees.

Figure 3:
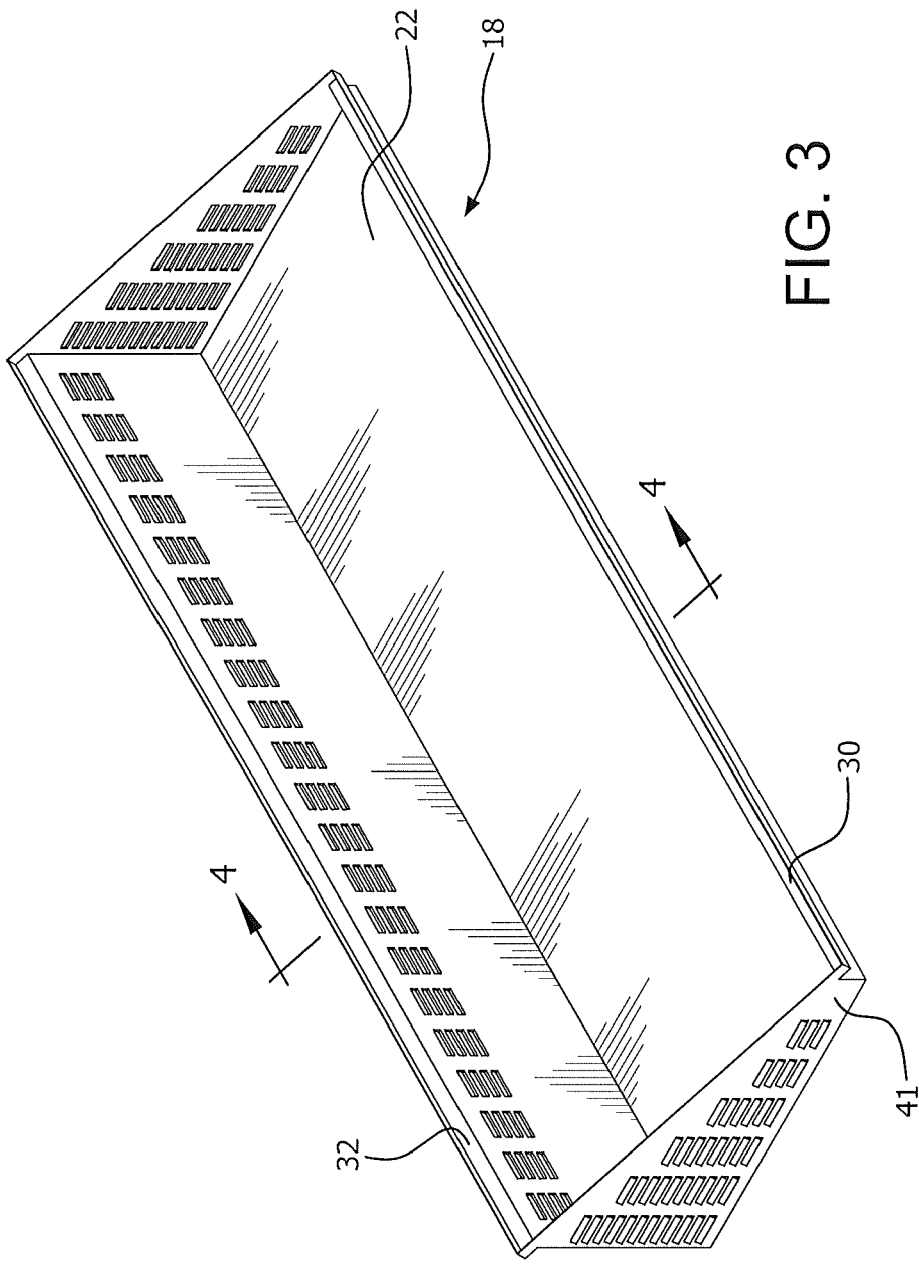
FIG. 3 is a perspective view of a mounting structure for a solar module frame.
Figure 4:
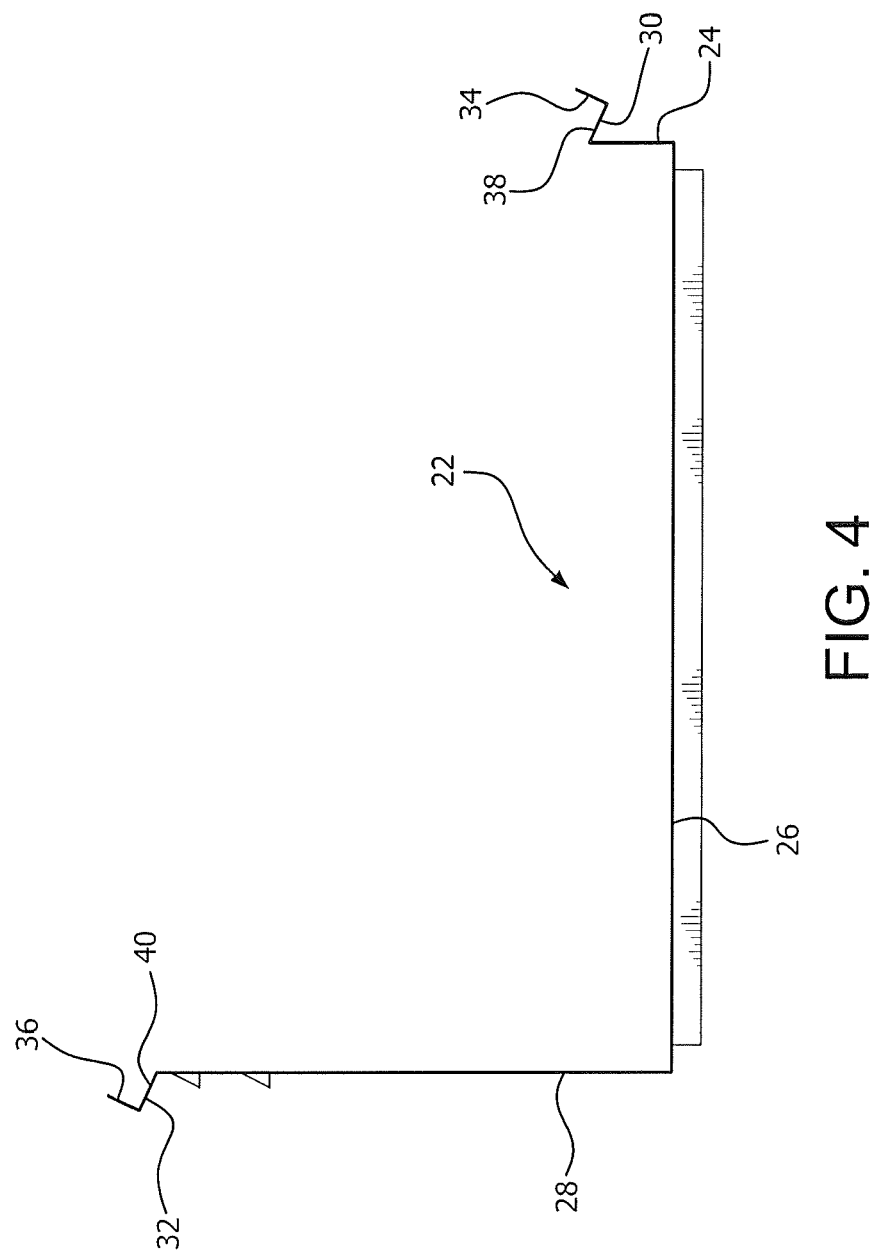
FIG. 4 is a sectional view of the mounting structure shown in FIG. 2, taken along line 4-4 in FIG. 3.

Referring to FIGS. 3 and 4, one or more mounting structures 18 have a continuous open channel structure, defining an elongated chamber 22. The mounting structure 18 includes a front wall 24, a bottom wall 26, a back wall 28, a lower panel support 30, and an upper panel support 32. When assembled, the module frame 12 is adapted to rest on the lower panel support 30 and the upper panel support 32. The lower panel support 30 extends outwardly and then bends at an angle to form a lower lip 34. The upper panel support 32 also extends outwardly and bends at an angle to form an upper lip 36. When assembled, the module frame 12 contacts lower docking support surface 38 and upper docking support surface 40. In addition, upon assembly, the module frame 12 also contacts lower and upper lips 34, 36. End caps 41 may also be used on the mounting structure 18, as shown in FIGS. 2 and 3.

Figure 11A:
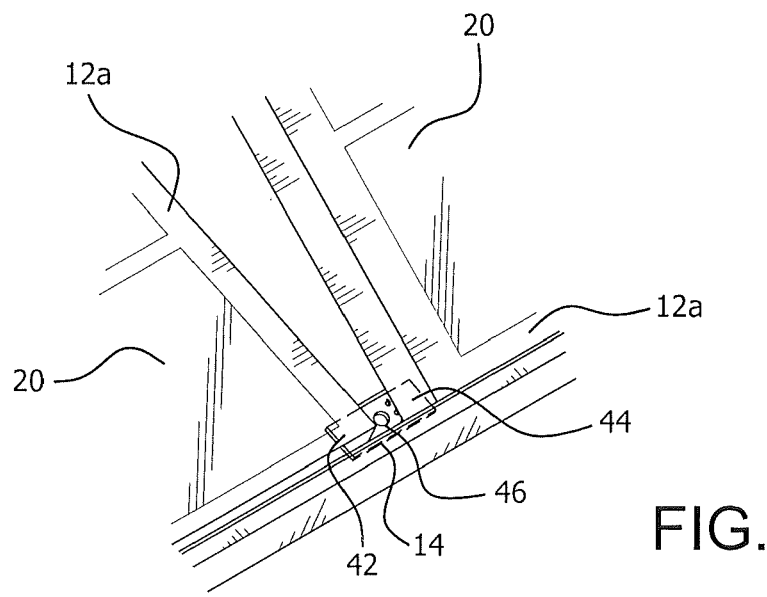
FIG. 11A is a detailed view illustrating the grounding system shown in FIG. 11.
Figure 14:
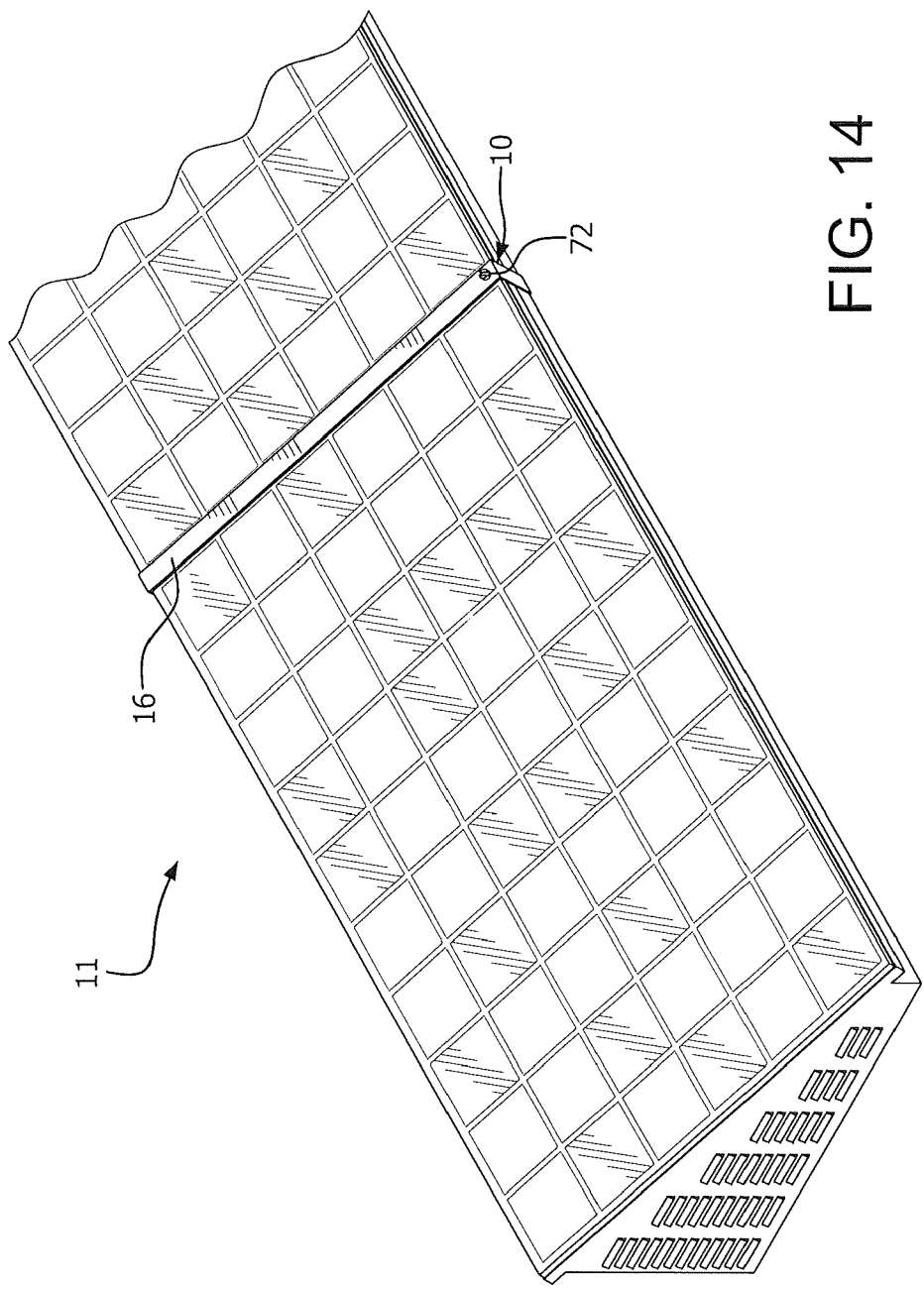
FIG. 14 is a partial perspective view of an assembled grounding system on a photovoltaic array.

A photovoltaic array 11 is broadly defined herein as two or more solar module panels mounted onto one or more mounting structures and arranged in predefined positions, as shown in FIGS. 14 and 15. Upon assembly, the grounding system 10 is used with an array 11 such that the grounding clip 14 is positioned between a first solar module frame 12a and a second solar module frame 12b (FIG. 11). After placement of the first solar module frame 12a, as shown in FIG. 2, the grounding clip 14 is positioned. Preferably, the grounding clip 14 is slid under solar module frame 12a (FIG. 1).

As shown in FIGS. 5-8, a grounding clip 14 includes a first region 42 of upwardly and downwardly extending protrusions 42a, 42b, and a second region 44 of upwardly and downwardly extending protrusions 44a, 44b. Preferably, the grounding clip 14 is made from a conductive material, such as metal, for example, 304 Stainless Steel. The regions 42, 44 are preferably punched or stamped into a plate, forming the clip. While stamping is the preferred method of manufacture, however, other methods of manufacture may be used. Multiple protrusion regions may be formed on a single sheet or plate, and then such sheet or plate may be cut or separated to form multiple grounding clips.

Although regions 42, 44 are shown having a generally rectangular outer periphery, this pattern is not to be construed as limiting. The grounding clip 14 may have any protrusion pattern that allows for proper grounding of a photovoltaic array. Geometrical configurations, however, are preferred. In addition, there may be any number of upwardly and downwardly extending protrusions within a region of the clip. The type of patterns and configurations chosen will depend, in part, upon the maximum series fuse rating for the solar panels, as further described below.

In preferred configurations, a clip through-hole 46 is provided through a central portion of the clip.

Figure 5:
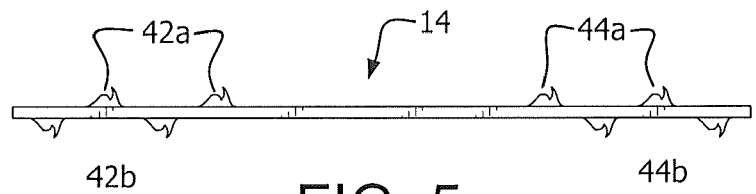
FIG. 5 is a front elevational view of a grounding clip according to a first configuration.
Figure 6:
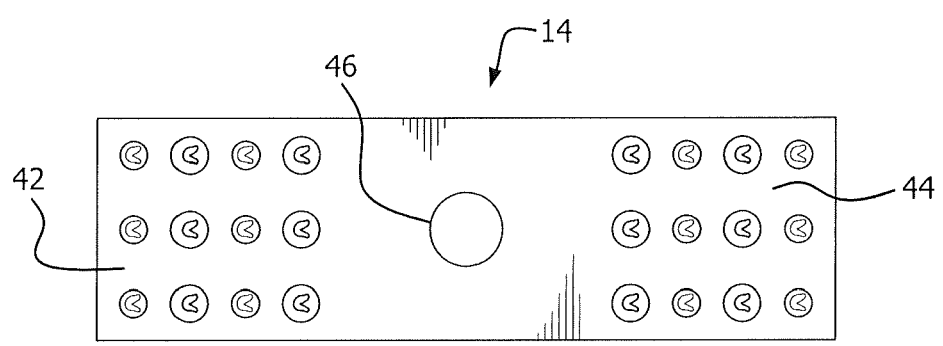
FIG. 6 is a top view of the grounding clip shown in FIG. 5.

FIGS. 5 and 6 show a grounding clip 14, according to one configuration, having first and second regions 42, 44 with six upwardly extending protrusions 42a, 44a and six downwardly extending protrusions 42b, 44b. In this configuration, the metal plate has a width of about 2.5 inches and a length of about ¾ inches and a thickness of about 0.015 inches. A ¼ inch diameter round through-hole 46 is provided in the plate positioned about 1.25 inches from the edge of the plate between first and second regions 42, 44. The protrusions preferably are punched or stamped into a metal plate at substantially equal intervals such that a substantially uniform pattern is produced. In FIGS. 5 and 6, the protrusions 42a, 42b, 44a, 44b are disposed in a series of parallel straight rows.

Figure 7:
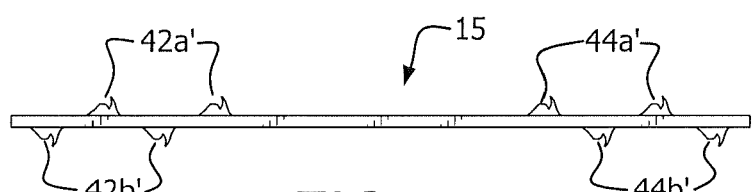
FIG. 7 is a front elevational view of a grounding clip according to a second configuration.
Figure 8:
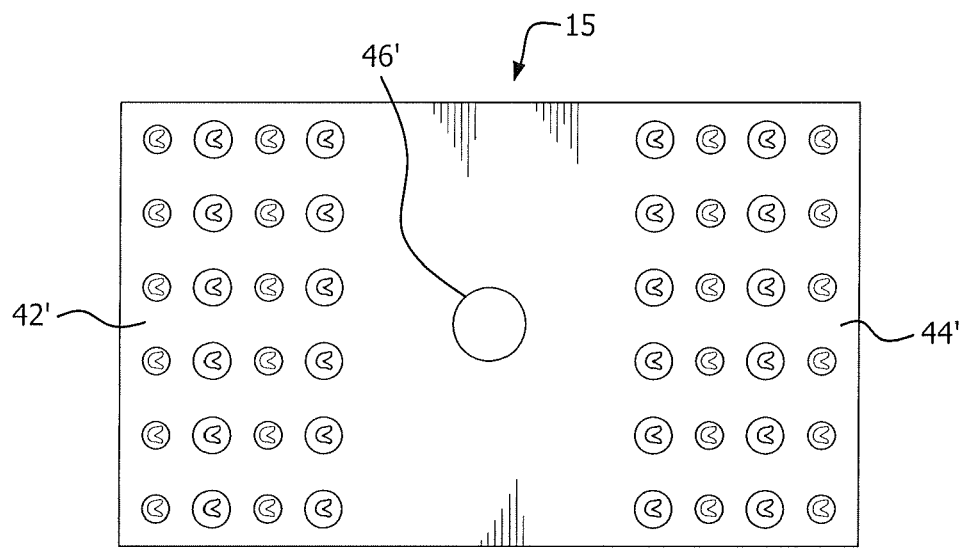
FIG. 8 is a top view of the grounding clip shown in FIG. 7.

FIGS. 7 and 8 show another configuration of the grounding clip 15, having an alternative protrusion arrangement. In this configuration, first and second regions 42', 44' have twelve upwardly extending protrusions 42a', 44a' and twelve downwardly extending protrusions 42b', 44b'. In this configuration, the metal plate has a width of about 2.5 inches and a length of about 1½ inches and a thickness of about 0.015 inches. A ¼ inch diameter round through-hole 46' is similarly provided in the plate and positioned about 1.25 inches from the plate edge between first and second regions 42', 44'.

Figure 9:
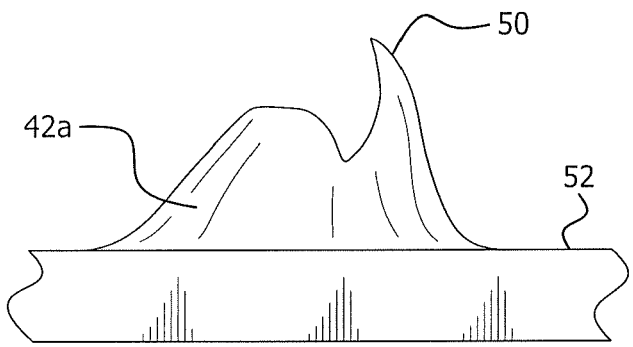
FIG. 9 is an enlarged side view of a protrusion with serrate portion on a grounding clip.
Figure 10:
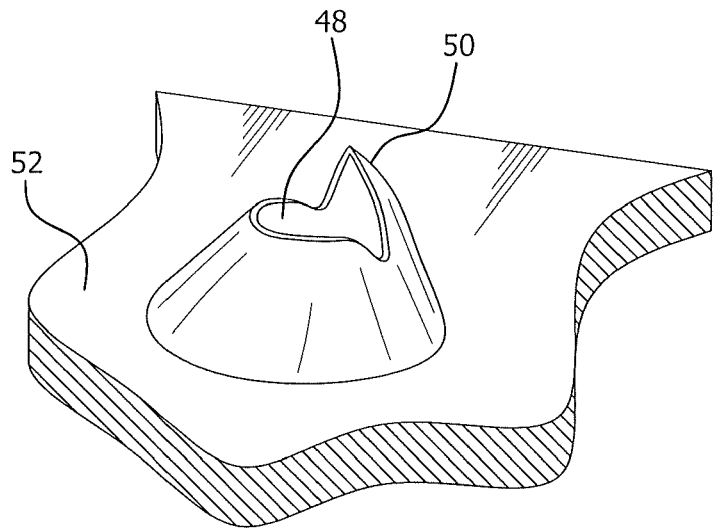
FIG. 10 is an enlarged perspective view of a protrusion with serrate portion on a grounding clip.

As shown in FIGS. 9 and 10, each protrusion 42a, 42b, 44a, 44b includes an aperture 48 and an extending serrate portion 50. After initial manufacture, the protrusions extend about 0.030 inches above the clip surface 52 and serrate portions 50 extend approximately 0.060 inches above the clip surface 52.

After placement of the first solar module frame 12a into the lower and upper panel supports 30, 32, as shown in FIG. 2, the grounding clip 14 is positioned such that the module 12a covers or contacts the first region 42. This positioning assures that all or a major portion of the upwardly extending protrusions 42a contacts the first solar module 12a and that all or a major portion of the downwardly extending protrusions 42b contacts the lower docking support surface 38. If a through-hole is provided, the grounding clip 14 should be positioned such that the through-hole 46 is not covered by the module 12a.

Figure 12:
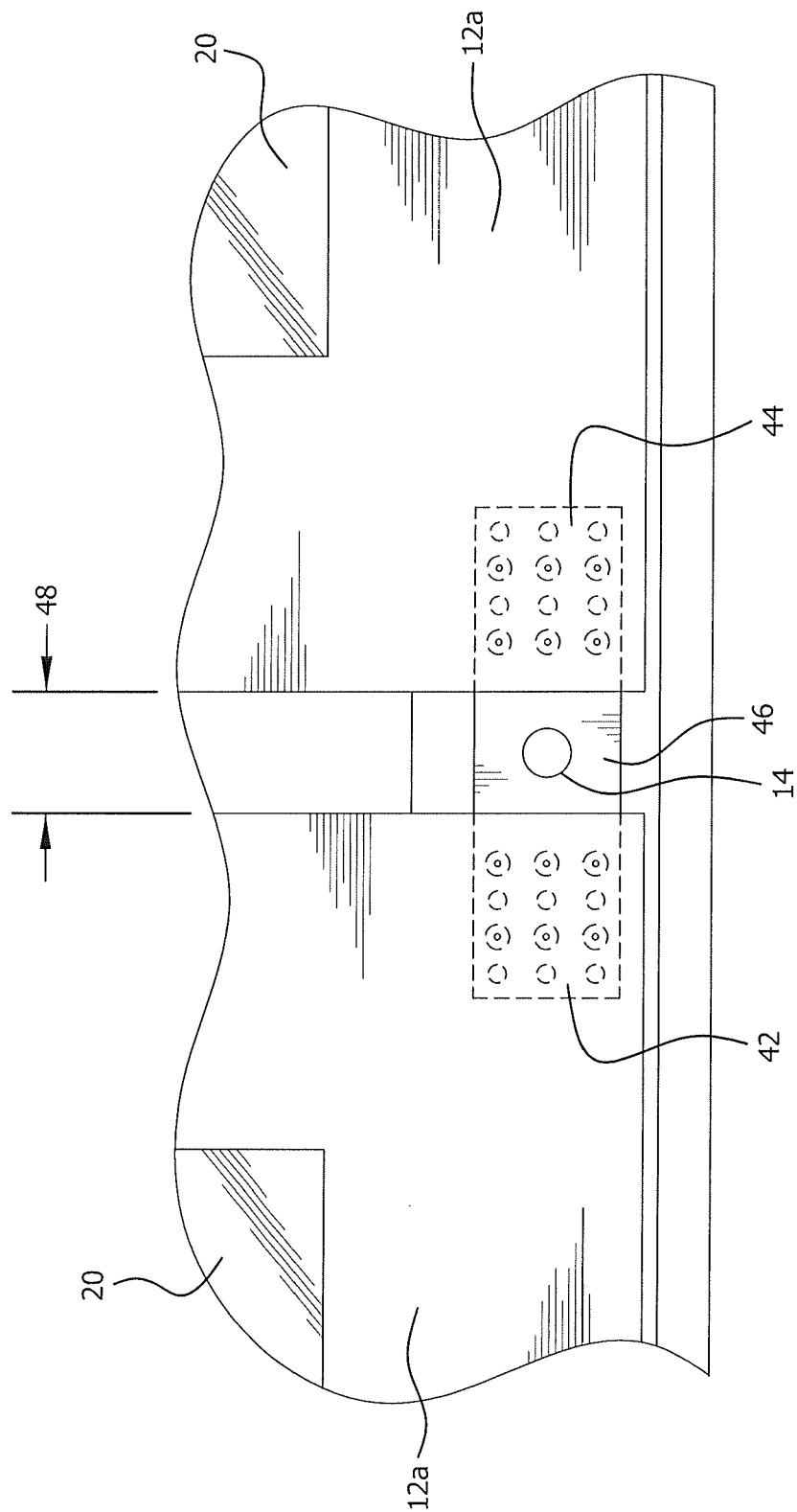
FIG. 12 is a top view of a partially assembled grounding system.

After placement of the grounding clip 14, the second solar module frame 12b is positioned to cover or contact the second region 44, as shown in FIGS. 11 and 12. This positioning assures that extending protrusions 44a contact the second solar module frame 12b and that downwardly extending protrusions 44b contact the lower docking support surface 38.

To account for thermal expansion of the solar panels, a gap 48 between the module frames 12a, 12b generally is required when the frames are mounted to a docking support structure. Preferably, this gap 48 is measured at approximately ½ inch. After assuring suitable positioning of the module frames 12a, 12b and the grounding clip 14, a dock through-hole 56 may be drilled into the lower docking support surface 38 for alignment with clip through-hole 46.

Figure 13:
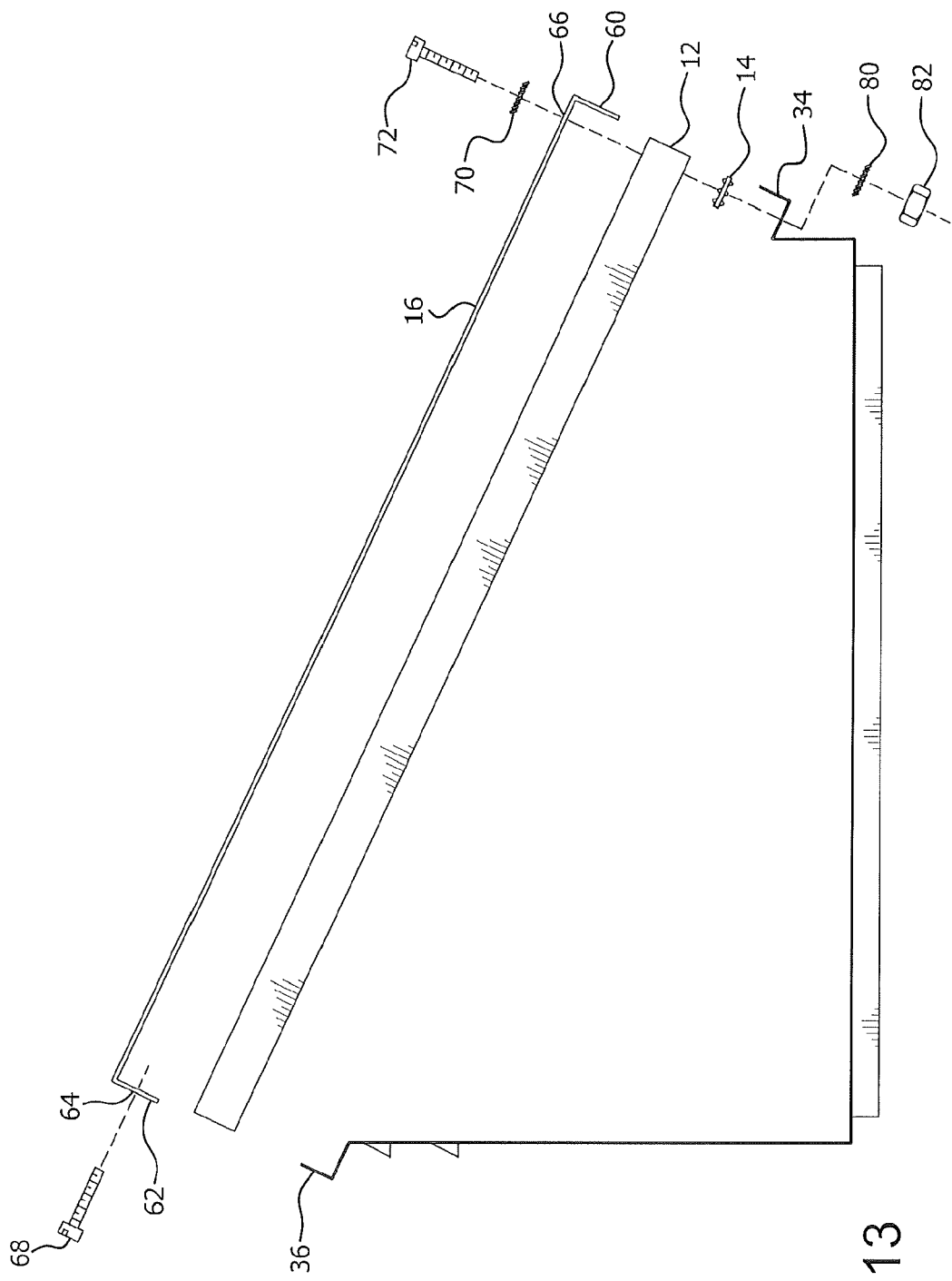
FIG. 13 is a side exploded view of the grounding system of FIG. 1.

To secure module frames 12a, 12b to the mounting structure 18, strap 16 is positioned over the module frames 12a, 12b and gap 48, as shown in FIGS. 13 and 14. The strap 16 is configured to extend over the length of module frames 12a, 12b and connects or contacts lower and upper lips 34, 36 of the mounting structure. The strap 16 has a lower section 60 adapted for connection with lower lip 34 and an upper section 62 adapted for connection with upper lip 36. Preferably, the lower and upper sections 60, 62 are provided with though-holes 64, 66 to facilitate connection of the strap 16 to the mounting structure. The strap 16 preferably is manufactured from aluminum sheeting, having a thickness of 0.125 inches (3 mm). In preferred configurations, the strap has an approximate width of 2 inches and at least two bends to facilitate connection of the strap to the upper and lower lips 34, 36. The overall length of the strap 16 will depend, in part, on the corresponding dimension (width or length) of module frames of the solar panels used.

After positioning the strap 16 over gap 48, the upper section 60 is attached to upper lip 36 using a fastener 68, such as a stainless steel tech screw. Other types of fasteners may, however, be used for attachment.

The lower section 62 then is coupled to the mounting structure 18, using a fastening assembly, as shown particularly in FIG. 1. Preferably, the assembly includes two star washers, a bolt, and a nut. In one configuration, the star washer 70 is coupled to a bolt 72, having a threaded shaft section 74 and an enlarged head 76 at one end of the shaft. The shaft section 74 is threaded through holes 66, 46, 56 in the lower section of the strap, the grounding clip 14, and the mounting structure 18. After threading, the bolt 72 is secured, using a second star washer 80 and nut 82 positioned on the lower panel support 30. A torque ranging from 60 to 100 inch-pounds is applied to the fastening assembly.

Upon applying torque to the fastening assembly to secure the strap 16, the grounding clip 14 is compressed such that some serrate portions 50 (FIGS. 9, 10) penetrate solar module frames 12a, 12b and some other serrate portions 50 penetrate lower docking support surface 38 (FIG. 4). Specifically, serrate portions 50 break through anodized layers on the frames and docking support surface to form a path for electrical current.

In providing a grounding path for a photovoltaic array, the grounding system 10 is incorporated at varying intervals along rows in the photovoltaic array 11. This arrangement provides a grounding path for the photovoltaic array 11 in accordance with international standards, as further described in the examples that follow.

Examples

Examples were conducted under TUV Rheinland/PTL Certification Standards. These Standards provide comprehensive qualification methods for photovoltaic or solar cell arrays. With respect to fastening systems for photovoltaic modules, TUV Rheinland Test Specification 2PfG 1904/01.11 includes test methods for (1) ground mounted systems; (2) solar trackers; (3) flat roof mounting systems, having roof penetration and/or weighing; (4) in-roof mounting system integration, which replace existing roof coverings; and (5) on-roof mounting systems for various types of roof coverings (including tile, pan, and sheet roofing). The Test Specification 2PfG 1904/01.11 assures that relevant industry technical requirements and best practices are met by considering, in part, safety regulations, manufacturing documentation, business processes of solar module manufacturers, and system inspections.

Under TUV Rheinland Test Specification 2PfG 1904/01.11, a Bonding Path Resistance test was conducted on two sample grounding systems, each using a grounding clip according to the second configuration (FIG. 8) and sections from commercially available solar module frames, manufactured in accordance with industry standards. The grounding system was adapted for solar modules having a maximum series fuse rating of 20A. Additional applicable Standards for the Bond Patent Resistance test include: IEC 61730-2 and ANSI/UL 1703.

According to TUV Rheinland Test Specification 2PfG 1904/01.11, a current at least two times the maximum series fuse rating was applied to a predetermined current path and measured thereafter. Two sample grounding systems, identified as Sample 001 and Sample 002, were respectively tested under thermal-cycling and humidity-freeze conditions, in accordance with UL 1703. Using a measured voltage drop, the resistance along the current path was then calculated. The test was evaluated on a PASS/FAIL basis, where the calculated resistance must be a maximum 0.1 ohm ($\Omega$) to pass. Testing results were as follows:

| Sample ID | Test Current, A (dc) | | Resistance, $\Omega$ | |
|---|---|---|---|---|
| | Initial | Final | Initial | Final |
| 001 | 40 | 40 | 0.0024 | 0.0023 |
| 002 | 50 | 50 | 0.0002 | 0.0114 |

All tested samples passed with a calculated resistance below 0.1 ohm ($\Omega$).

Thus, a grounding system for a photovoltaic array is disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A grounding system for a photovoltaic array, comprising:
    at least one strap adapted to mount a first solar module frame and a second solar module frame to a docking support surface; and
    at least one grounding clip coupled to the at least one strap, having a first region with upwardly and downwardly extending protrusions and a second region with upwardly and downwardly extending protrusions, wherein each protrusion has a serrate portion adapted to penetrate a surface of a solar module frame or a surface of a docking support surface for the solar module frames.

2. The grounding system of claim 1, wherein the grounding clip defines at least one through-hole positioned between the first and second regions of protrusions.

3. The grounding system of claim 1, wherein the strap defines at least one through-hole at a lower end of said strap.

4. The grounding system of claim 1, further comprising a fastener coupled to the at least one strap and the at least one grounding clip.

5. The grounding system of claim 1, wherein the strap defines at least one through-hole at a lower end of said strap and the strap through-hole and the grounding clip through-hole are substantially aligned.

6. The grounding system of claim 1, wherein the at least one grounding clip is electrically coupled to the solar module frame at at least three contact points.

7. The grounding system of claim 1, wherein the at least one grounding clip is electrically coupled to the docking support surface.

8. A method of installing a grounding system for a photovoltaic array, comprising:
    positioning a first solar module frame on a docking support surface;
    positioning a grounding clip between the docking support surface and the first solar module frame;
    positioning a second solar module frame on the docking support surface with a portion contacting the grounding clip; and
    coupling a strap to the first solar module frame, the second solar module frame, and the grounding clip so that first raised portions of the grounding clip penetrate into the first solar module frame and second raised portions of the grounding clip penetrate into the second solar module frame and oppositely raised portions of the grounding clip penetrate into the docking support surface.

9. The method of claim 8, further comprising coupling a fastener to the strap.

10. The method of claim 9, further comprising inserting the fastener into through-holes disposed on the strap, the grounding clip, and the docking support surface.

* * * * *